US005771238A

United States Patent [19]

Sutton

[11] Patent Number: 5,771,238

[45] Date of Patent: Jun. 23, 1998

[54] ENHANCED ONE WAY RADIO SEVEN BIT DATA NETWORK

[76] Inventor: Michael Seward Sutton, 1A Glasgow Street, Kelburn, Wellington, New Zealand

[21] Appl. No.: 513,971

[22] PCT Filed: Sep. 10, 1994

[86] PCT No.: PCT/NZ94/00019

§ 371 Date: Jan. 2, 1996

§ 102(e) Date: Jan. 2, 1996

[87] PCT Pub. No.: WO94/21051

PCT Pub. Date: Sep. 15, 1994

[30] Foreign Application Priority Data

Mar. 10, 1993 [NZ] New Zealand .......................... 247104

[51] Int. Cl.[6] ...................................................... H04J 3/00

[52] U.S. Cl. ........................................... 370/474; 370/477

[58] Field of Search ................................. 370/118, 7, 99, 370/94.1, 94.2, 60, 60.1, 389, 391, 392, 435, 438, 493, 494, 495, 470, 471, 472, 474, 476, 477; 375/240; 348/348, 384; 455/72; 380/23

[56] References Cited

U.S. PATENT DOCUMENTS

| | | | |
|---|---|---|---|
| 5,146,457 | 9/1992 | Veldhuis et al. | 370/118 |
| 5,293,379 | 3/1994 | Carr | 370/118 |

*Primary Examiner*—Dang Ton

*Attorney, Agent, or Firm*—Jacobson, Price, Holman & Stern, PLLC

[57] ABSTRACT

Transmission (206) and reception techniques and apparatus (209) allow a restricted seven bit one way radio data network, such as a paging network (202), to transmit eight bit ASCII and binary data. The encoding and decoding techniques preferably include encryption and decryption of transmitted data. Command and control functions may thus be transmitted in addition to normal messages which with suitable receiver decoders (209) allow remote reconfiguration and management of the receivers (203).

6 Claims, 14 Drawing Sheets

Where a "." is printed the actual data generated was an unprintable character, either a control code or with an ASCII value in excess of 128 (8 bit character).

1100000>CRC_NONE<Wed Feb 24 23:32:00 1993~The Clinton administration is working out the fine details of an emergency airdrop of relief supplies to encircled villages in eastern Bosnia in an operation questioned by some military experts. President Bill Clinton discussed the plan with UN Secretary-General Boutros Boutros-Ghali. Clinton's spokeswoman Dee Dee Myers said afterwards there was "complete agreement on the necessity of the mission".

```
ENCODE:        >67:NW0.1.TTXT.INTL-The Clinton administration is working out the fine <
SubChannel     > :33<
SubChaneled    >68:!NW0.1.TTXT.INTL-The Clinton administration is working out the fine <
Huffman Pak    >45:!.......|D......>KI.........C............k".@<
Framed         >47:.-!.......|D......>KI.........C............k".@<
Encoded        >51:Z....i.......xKL.......4......$7..,i.....g..+..(F..<
8-bit UnPak    >59:-$q..1R.@@.; ..x%S.q..=QayFNL+!tk;.C8bb,4gQ/LSPgP".<.0PF.g <
Stuffed        >72:-$q~ ~_1R~&@@~!; ~2~&x%S~/q~(~$=QayFNL+!tk;~$C8bb,4gQ/LSPgP"~%<~.0PF~$g <

DECODE:        >72:-$q~ ~_1R~&@@~!; ~2~&x%S~/q~(~$=QayFNL+!tk;~$C8bb,4gQ/LSPgP"~%<~.0PF~$g <
UnStuffed      >59:-$q..1R.@@.; ..x%S.q..=QayFNL+!tk;.C8bb,4gQ/LSPgP".<.0PF.g <
7-bit Pak      >51:Z....i.......xKL.......4......$7..,i.....g..+..(F..<
Decode OK      >47:.-!.......|D......>KI.........C............k".@<
UnFramed       >45:!.......|D......>KI.........C............k".@<
HuffmanUnPk    >68:!NW0.1.TTXT.INTL-The Clinton administration is working out the fine <
UnSubChanel    >67:NW0.1.TTXT.INTL-The Clinton administration is working out the fine <
SubChannel     > :33<
```

FIG 6a

```
ENCODE:        >71:NW0.2..details of an emergency airdrop of relief supplies to encircled <
SubChannel     > :33<
SubChaneled    >72:!NW0.2..details of an emergency airdrop of relief supplies to encircled <
Huffman Pak    >44:!.....g.Z.+*l..........x.....u.X$..J...../U@<
Framed         >46:.,!.....g.Z.+*l..........x.....u.X$..J...../U@<
Encoded        >50:...l...>..5..(..9.}.gG.1.[..69.D~.(.r-.1...].vnE..<
8-bit UnPak    >58:pn .H.i<.!y.,.V(e...+w.g#tF.bn....>T#zr(k\EX!F+S@W6G39..|.<
Stuffed        >73:pn ~$H.i<~?!y~3,~"V(e~ ~'~;+w.g#tF~8bn~:~=~;~.>T#zr(k\EX!F+S@W6G39~+~0|~ <

DECODE:        >73:pn ~$H.i<~?!y~3,~"V(e~ ~'~;+w.g#tF~8bn~:~=~;~.>T#zr(k\EX!F+S@W6G39~+~0|~ <
UnStuffed      >58:pn .H.i<.!y.,.V(e...+w.g#tF.bn....>T#zr(k\EX!F+S@W6G39..|.<
7-bit Pak      >50:...l...>..5..(..9.}.gG.1.[..69.D~.(.r-.1...].vnE..<
Decode  OK     >46:.,!.....g.Z.+*l..........x.....u.X$..J...../U@<
UnFramed       >44:!.....g.Z.+*l..........x.....u.X$..J...../U@<
HuffmanUnPk    >72:!NW0.2..details of an emergency airdrop of relief supplies to encircled <
UnSubChanel    >71:NW0.2..details of an emergency airdrop of relief supplies to encircled <
SubChannel     > :33<

ENCODE:        >69:NW0.3..villages in eastern Bosnia in an operation questioned by some <
SubChannel     > :33<
SubChaneled    >70:!NW0.3..villages in eastern Bosnia in an operation questioned by some <
Huffman Pak    >42:!.....{...p......... .....[.q0........B...<
Framed         >44:.*!.....{...p......... .....[.q0........B...<
Encoded        >48:.........5.B...........Z..XdpuX[.Es.C......8N...l<
8-bit UnPak    >55:j'.0L7.zz.=t...'X=|.m.UdfVY .aHp:V.0".g.!bxNDk.h..]8u.X<
Stuffed        >71:j'~#0L7~-zz~-=t~7~4~9'X=|~*m~#UdfVY ~*aHp:V~+0"~5g~$!bxNDk~-h~<~3]8u~5X<
```

FIG 6b

```
DECODE:        >71:j'~#0L7~-zz~-=t~7~4~9'X=|~*m~#UdfVY ~*aHp:V~+0"~5g~$!bxNDk~-h~<~3]8u~5X<
UnStuffed      >55:j'.0L7.zz.=t...'X=|.m.UdfVY .aHp:V.0".g.!bxNDk.h..]8u.X<
7-bit Pak      >48:........5.B...........Z..XdpuX[.Es.C......8N...I<
Decode  OK     >44:.*!.....{...p......... .....[.q0........B...<
UnFramed       >42:!.....{...p......... .....[.q0........B...<
HuffmanUnPk    >70:!NW0.3..villages in eastern Bosnia in an operation questioned by some <
UnSubChanel    >69:NW0.3..villages in eastern Bosnia in an operation questioned by some <
SubChannel     > :33<

ENCODE:        >67:NW0.4..military experts. President Bill Clinton discussed the plan <
SubChannel     > :33<
SubChaneled    >68:!NW0.4..military experts. President Bill Clinton discussed the plan <
Huffman Pak    >43:!.........^<..R[.)...!V....vib.aT%..Z.....(<
Framed         >45:.+!.........^<..R[.)...!V....vib.aT%..Z.....(<
Encoded        >49:....Oa.d%....;...o.Ni1@.....% ........8...g.Xm.0F<
8-bit UnPak    >56:e7..2=B.2.>.fx.;.IWV|Q.i.P.=.8!..H.O,&=fcb..G...3qk.n8`F<
Stuffed        >76:e7~:~=2=B~.2~)>~!fx~,;~)IWV|Q~<i~8P~"=~_8!~&~2H~;O,&=fcb~!~3G~,~1~13qk~&n8`F<

DECODE:        >76:e7~:~=2=B~.2~)>~!fx~,;~)IWV|Q~<i~8P~"=~_8!~&~2H~;O,&=fcb~!~3G~,~1~13qk~&n8`F<
UnStuffed      >56:e7..2=B.2.>.fx.;.IWV|Q.i.P.=.8!..H.O,&=fcb..G...3qk.n8`F<
7-bit Pak      >49:....Oa.d%....;...o.Ni1@.....% ........8...g.Xm.0F<
Decode  OK     >45:.+!.........^<..R[.)...!V....vib.aT%..Z.....(<
UnFramed       >43:!.........^<..R[.)...!V....vib.aT%..Z.....(<
HuffmanUnPk    >68:!NW0.4..military experts. President Bill Clinton discussed the plan <
UnSubChanel    >67:NW0.4..military experts. President Bill Clinton discussed the plan <
SubChannel     > :33<
```

FIG 6c

```
ENCODE:         >66:NW0.5..with UN Secretary-General Boutros Boutros-Ghali. Clinton's <
SubChannel      > :33<
SubChaneled     >67:!NW0.5..with UN Secretary-General Boutros Boutros-Ghali. Clinton's <
Huffman Pak     >47:!..........-.Xw/k....Z..]h...*.<..S.jP..f. ....<
Framed          >49:./!..........-.Xw/k....Z..]h...*.<..S.jP..f. ....<
Encoded         >53:..N.....J_bO...{.z.>.ZG.U!..y.#.a".`wdC..~.h..].H....<
8-bit UnPak     >61:I$.`hkuV\.Kv.>5[k.~wS|}_-.wu).)I<fd>+.E%0.ID.`*~CZ._zv&HJxv..<
Stuffed         >74:I$~)`hkuV\~2Kv~2>5[k~>~~wS|}_-~1wu)~')I<fd>+~$E%0~=ID~<`*~~CZ~<_zv&HJxv.~(<

DECODE:         >74:I$~)`hkuV\~2Kv~2>5[k~>~~wS|}_-~1wu)~')I<fd>+~$E%0~=ID~<`*~~CZ~<_zv&HJxv.~(<
UnStuffed       >61:I$.`hkuV\.Kv.>5[k.~wS|}_-.wu).)I<fd>+.E%0.ID.`*~CZ._zv&HJxv..<
7-bit Pak       >53:..N.....J_bO...{.z.>.ZG.U!..y.#.a".`wdC..~.h..].H....<
Decode  OK      >49:./!..........-.Xw/k....Z..]h...*.<..S.jP..f. ....<
UnFramed        >47:!..........-.Xw/k....Z..]h...*.<..S.jP..f. ....<
HuffmanUnPk     >67:!NW0.5..with UN Secretary-General Boutros Boutros-Ghali. Clinton's <
UnSubChanel     >66:NW0.5..with UN Secretary-General Boutros Boutros-Ghali. Clinton's <
SubChannel      > :33<

ENCODE:         >59:NW0.6..spokeswoman Dee Dee Myers said afterwards there was <
SubChannel      > :33<
SubChaneled     >60:!NW0.6..spokeswoman Dee Dee Myers said afterwards there was <
Huffman Pak     >39:!.......I....n...n+v....(.Xe....*..m..@<
Framed          >41:.'!.......I....n...n+v....(.Xe....*..m..@<
Encoded         >45:.s.........5W..AyT...,.\...0......6..2...."/.<
8-bit UnPak     >52:h\p-G.]gS.4=)U/X.P/.$..).:.A7#f0."#.v4.6}xf!G&+*..s <
Stuffed         >65:h\p-G~8]gS~#4=)U/X~/P/~5$~'~3)~6:~+A7#f0~ "#~,v4~86}xf!G&+*~1~+s <
```

FIG 6d

```
DECODE:        >65:h\p-G~8]gS~#4=)U/X~/P/~5$~'~3)~6:~+A7#f0~ "#~,v4~86}xf!G&+*~1~+s <
UnStuffed      >52:h\p-G.]gS.4=)U/X.P/.$..).:.A7#f0."#.v4.6}xf!G&+*..s <
7-bit Pak      >45:.s.........5W..AyT...,.\...0......6..2...."/.<
Decode OK      >41:.'!.......l....n...n+v....(.Xe....*..m..@<
UnFramed       >39:!.......l....n...n+v....(.Xe....*..m..@<
HuffmanUnPk    >60:!NW0.6..spokeswoman Dee Dee Myers said afterwards there was <
UnSubChanel    >59:NW0.6..spokeswoman Dee Dee Myers said afterwards there was <
SubChannel     > :33<

ENCODE:        >60:NW0.^.."complete agreement on the necessity of the mission".<
SubChannel     > :33<
SubChaneled    >61:!NW0.^.."complete agreement on the necessity of the mission".<
Huffman Pak    >39:!.....:...#m%................M.......w8<
Framed         >41:.'!.....:...#m%................M.......w8<
Encoded        >45:=.u.;..:...bL..Z.S...\.....jE<l#......K...VO<
8-bit UnPak    >52:.x.Z.o+&. a.#..NS.S5...W.W..6.#-5.'Dl..5yj[\B/h.dUlp<
Stuffed        >71:~>x~.Z~1o+&~= a~<#~)~9NS~6S5~<~3~5W~7W~<~+6~8#-5~1'Dl~.~?5yj[\B/h~0dUlp<

DECODE:        >71:~>x~.Z~1o+&~= a~<#~)~9NS~6S5~<~3~5W~7W~<~+6~8#-5~1'Dl~.~?5yj[\B/h~0dUlp<
UnStuffed      >52:.x.Z.o+&. a.#..NS.S5...W.W..6.#-5.'Dl..5yj[\B/h.dUlp<
7-bit Pak      >45:=.u.;..:...bL..Z.S...\.....jE<l#......K...VO<
Decode OK      >41:.'!.....:...#m%................M.......w8<
UnFramed       >39:!.....:...#m%................M.......w8<
HuffmanUnPk    >61:!NW0.^.."complete agreement on the necessity of the mission".<
UnSubChanel    >60:NW0.^.."complete agreement on the necessity of the mission".<
SubChannel     > :33<
```

FIG 6e

ENHANCED ONE WAY RADIO SEVEN BIT DATA NETWORK

BACKGROUND OF THE INVENTION

1. Field of the Invention

This invention generally relates to the area of data transmission over a one way radio system. In particular the invention relates to data transmission protocols used with a paging system having a transmitter and a plurality of portable selective call receivers (paging receivers) having an intelligent message handling facility. The invention extends to seven bit networks, eight bit ASCII and binary data transmission capabilities and provides an "over-the-air" encoded security management and control system for remote units on either type of network.

2. Description of the Related Art

A signalling protocol developed by the British Post Office Code Advisory Group (POCSAG) is widely used in paging systems. This signalling protocol was adopted by the CCIR in recommendation 584-1. POCSAG is a paging protocol which enables the transmission of tone, numeric and alphanumeric messages. The POCSAG protocol provides for the transmission of 128 seven bit characters as specified in CCITT ASCII Alphabet No. 5.

The POCSAG protocol as well as other 7 bit paging transmission protocols such as Golay Sequential Code (GSC) and ERMES paging system as defined by the European Telecommunications Standards Institute (ETSI) suffer significant limitations in their implementation by paging networks and in their application by end users. The limitations are caused by the protocols being based on a 7 bit code-set whereas all computer systems including hand-held, notebook and desk based computers are based on architectures which support 8 bit character sets (256 characters). These 7 bit paging protocols are essentially incompatible with the complete requirements of computing technology based on the extended ASCII 256 character set.

Several functional limitations are imposed by paging networks in their actual implementation of the paging protocols. Two of these are significant technical limitations which prevent the user from sending all the 7 bit characters specified by the paging protocols respective standards. The first technical limitation is related to Data-entry systems which enable users of the paging networks to use in-house computers to enter messages directly into the paging networks via modems and the dial-up telephone network. Data-entry programs resident on the paging network computers arbitrarily prohibit the user from entering specific characters. Telecom New Zealand and VodaaPage (UK), as an example, prohibit any message that contains one or more characters with values in the range of 0–31 and 127 as specified by POCSAG protocols CCITT ASCII Alphabet No. 5, (approximately 25% of the available characters specified by the Protocol). This limitation can be addressed to some extent by the network agreeing to modify the programs that control the data entry system which users can access. ASCII characters 8, 10 and 13 are however examples of characters that can not be permitted as they are used to control the users editing of a message via the Data-entry programs.

It is, however, not possible to remove the Data-entry restrictions on all the other prohibited characters as further limitations are imposed by the encoding and transmission control equipment that has been developed and selected for utilisation by the Paging Networks. The equipment manufacturers have implemented hardware equipment which is remotely controlled by the transmission of specified control characters. If these control characters are transmitted within a message, which has been entered directly by a user, the paging network may cease all transmissions. In the case of Telecom New Zealand any message containing ASCII characters 17 or 19 (XON and XOFF), which are flow control characters will cause the Network to cease transmission or interrupt its service.

A further problem imposed on users by paging networks is the insertion of arbitrary trailing characters onto the end of the user's message packet. Telecom New Zealand insert two ASCII 32 (space) characters on the end of each message. If the paging receiver was to concatenate several messages into an extended message file the insertion of these "trailing blanks" would cause a user defined error checking system to indicate that the message had been modified/damaged and the receiver would then reject the file.

A further limitation preventing transmission of all characters in the CCITT Alphabet No. 5 has been imposed by certain manufacturers of pager receiver decoder chips. The POCSAG protocol transmits data in BCH 32,21 information words. Each contain three 7 bit characters. where a complete paging message has been transmitted and the final BCH information word contains less than 3 characters a decoder may generate and insert ASCII 0 (Null) characters to fill out the information word to three characters. Again if several packets were to be transmitted and later concatenated by the receiving pager, the receivers independent error checking system would report that the concatenated packets have been damaged and again the receiver would reject the integrity of this file. Philips POCSAG 5001T decoders, as an example, generate trailing Null characters in the manner described above.

Paging decoder chips sometimes append an ASCII 4 (EOT) character as the last character of a received message to indicate that the paging message is complete. The EOT character is interpreted by a microprocessor which is part of the paging receiver.

Therefore if a user transmitted a message which included EOT characters the pager would misinterpret incoming paging messages. Therefore pagers which use an EOT sequence must avoid being sent any message with that specific character.

The combined limitations of the paging network protocols, the Data-entry programs and certain decoders prevent users from entering or transmitting eight bit ASCII characters, binary data images or from encrypting the information being transmitted on 7 bit radio paging networks.

Development of paging receivers which operate on paging networks has been restricted by the limitations referred to. Because it has not been possible to transmit the complete 7 bit data set as specified in the standards, it has therefore prevented the implementation and provision of encryption services. Encryption of data provides users and networks with benefits and services. If data can be encrypted by the user prior to it's delivery to, and transmission by the network on behalf of the user, the user is protected from the information being monitored by unauthorised third parties or by staff at the paging network computer centre. The inability to encrypt data has also prevented the paging network from being able to develop the capability to transmit messages which can remotely control and reconfigure the pager receivers. Currently all pager receivers must be configured by physically interfacing the unit with a programming device. If encrypted messages capable of transmitting binary data was permitted the Network would be able to activate/ remove services from specific pager receivers without the need to physically take possession of the device. This would also enable the network to manage large groups of units, such as value added pay-to-use services, all of which share the same Receiver Identification Code (RIC) enabling units which were stolen or lost to be deactivated remotely, even though their physical location was not known to the network. Implementation of a remote command and control system for the paging networks must be able to address all of the above limitations which vary between different network implementations and protocols.

SUMMARY OF THE INVENTION

In one aspect the present invention consists in a method of preparing a message packet for digital data transmission which enables eight bit data, binary data and control messages to be encapsulated in a 7 bit character packet where one or more of the 7 bit characters are prohibited comprising the steps of:

(1) analysing a message to be transmitted to ascertain if it is a control message or a data message, (2) if a data message, (a) analysing it to determine if it can be compressed according to a known compression technique and if so compressing the data by that technique, (b) if compression was not possible, and if the data consists of characters which are uniquely determined by 7 bits, treating the data as a 7 bit character string, and stuffing the 7 bit character string into an 8 bit string, (c) assigning a sub-channel number to data which is processed according to steps 2(a) or (b) or which has not been so processed, (3) assembling a message packet which incorporates (a) framing information which includes bits which indicate whether the packet is control data or message data, (b) information indicative of assigned sub-channel where the message is a data message, and (c) the control data or (d) the compressed, stuffed or unoptimised message data, (4) unpacking the packet from 8 bit bytes to 7 bit bytes, (5) analysing the 7 bit byte packet to ascertain if it contains any prohibited characters and if so substituting such prohibited characters with a suitable escape character and a complementary check character to produce the message packet for transmission.

In a second aspect the invention consists in apparatus for conditioning data for transmission which enables eight bit data, binary data and control messages to be encapsulated in a seven bit character packet where one or more of the seven bit characters are prohibited which executes the method set forth above.

In a third aspect the invention consists in a method of receiving an incoming encoded binary message having packets transmitted over a paging network by a selective call receiver which enables the message receiver to receive at a single network address, unmodified paging messages and to selectively accept or reject eight bit data information messages and encoded control messages as well as being able to accept or reject data information messages specified for a specific subchannel (0–255) for which the receiver respectively is or is not currently authorised to accept; for each received packet on an incoming message the method comprising the steps of:

(1) if the received packet has a predetermined header and the receiver is configured to receive unmodified messages, then processing the packet as a modified packet according to steps (2) to (8), otherwise sending the packet to a user's application as an unmodified paging message, (2) if the receiver is configured to receive only data information messages processing the packet according to steps (3) to (8);

(3) treating the packet, as 7 bit characters and reconstituting any characters indicated by a predetermined flag, (4) packing the 7 bit characters into 8 bit characters, (5) checking a frame byte for type of packet and compression, (6) decompressing the packet to data, (7) validating the subchannel and if valid releasing security passing the data to an end user application and, (8) if the message is a control message parsing and processing the control message.

In summary the present protocol supports:

i. transmission of 8 bit data over a 7 bit restricted network;

ii. remote reconfiguration and management of receiver units;

iii. the targeting of encoded or unencoded data packets to subsidiary addresses (1–256) at each network destination receiver identification code (RIC) address; and iv. adaptive optimisation of data transmission through data compression or packing.

The invention permits Network Providers (NP) and Information Service Providers (ISP) to have encrypted configuration control over value added point-to-multipoint services, which can be transmitted on closed user—group radio frequencies or via open third-party networks, without requiring adjustment to the control or transmission facilities of the network.

The invention is designed to be implemented as a peripheral or embedded attachment for hand-held communication devices or personal computers.

BRIEF DESCRIPTION OF THE DRAWINGS

FIGS. 6*a*–6*e* show a sequence of message encoding and decoding according to the present invention.

DETAILED DESCRIPTION OF THE PREFERRED EMBODIMENT

Figure 5:
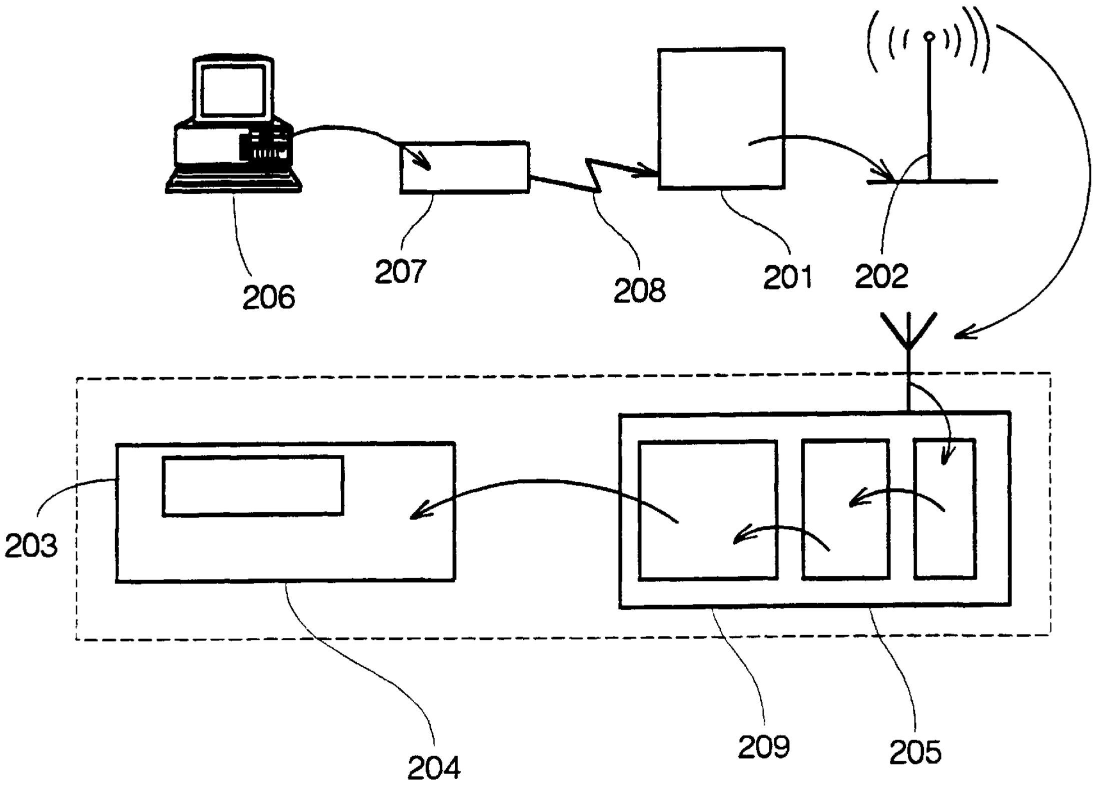
FIG. 5 shows in diagrammatic form a paging network employing the present invention.

The application of the invention to existing paging networks can be appreciated from FIG. 5. A seven bit paging network is shown with a Network Provider computer 201, radio transmitter 202 and a paging receiver 203. The receiver consists of a handheld computer 204 to which is fitted a radio receiver and data decoder unit 205 which provides computer 204 with data received for that paging receiver from transmitter 202. An Information Service Provider who wishes to provide data to users of the paging network having receivers of the type described operates a computer 206 which feeds data to the Network Provider's computer 201 using, for example, a modem 207 and telephone line 208.

The present invention provides software for the ISP computer 206 which enables full 8 bit data to be input and manipulates this data to produce 7 bit data suitable for transmission over the NP's paging network. Paging receiver 203 is provided with a modified decoder 209 to extract the ISP's 8 bit commands from the incoming 7 bit data stream.

On the transmission side the present invention processes all information as 8 bit data and prior to transmission via the network the data is converted if necessary to 7 bit data containing only those seven bit characters which the specific network will permit data-entry and transmission of. The steps involved and executed on the ISP's computer 201 are:

a) Data to be transmitted is analysed to determine what type of message it is (control message or data message). If it is a control message, Bit 5 of the framing byte is set.

Figure 4:
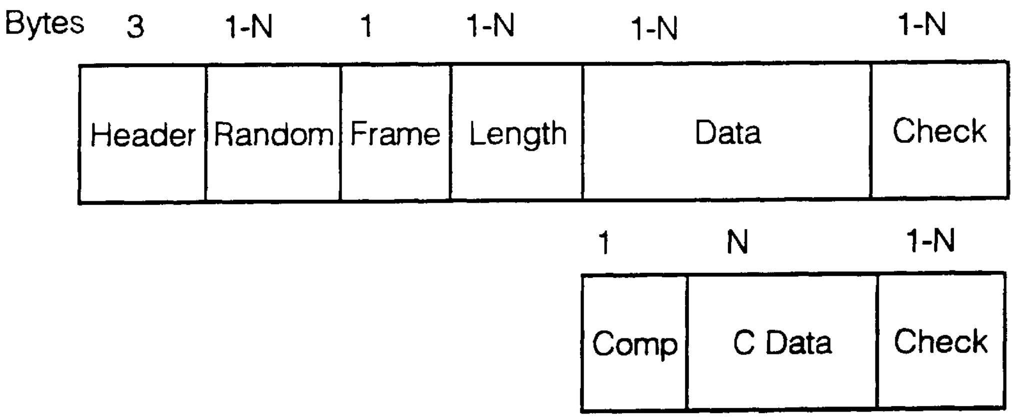
FIG. 4 shows the message packet protocol of the present invention.

| Framing Byte Bits | |
|---|---|
| 0, 1, 2 | Version |
| 3 | Huffman Compressed |
| 4 | High Subchannel information |
| 5 | Control Message |
| 6 | 8 to 7 bit packing |

b) The "data message" is analysed to determine whether it can be compressed using a compression routine which is specific to implementation and not to this invention. In this invention Huffman encoding is utilised. If compression is possible the data is compressed using the optimum compression table. A maximum of 32 compression tables are provided for with compression of up to 70% being obtained. If the data is compressed, a leading byte is inserted in front of the compressed data. The three lease significant bits are the remainder of the compression routine and are used to instruct the decompression routine how many bits of the last compressed byte to use. The most significant 5 bits represent a value of 0–31 indicating which compression table or system was used.

c) It may not be possible to compress the data using the compression tables as the originating data may include ASCII characters that are not included in the compression tables used in a specific implementation of the invention. However, if the data to be transmitted comprises characters wholly in the range of ASCII 0–127, an "8 to 7 bit packing" flag is set and a routine will "stuff" the 7 bit character string into an eight bit string providing a compression of 14%.

d) If the data is an information packet and not a control packet a subchannel of 0–255 is assigned. If the subchannel to be assigned is greater than 127 then Bit 4 of the framing byte is set and the first character of the data packet will provide the remaining seven bits of subchannel.

e) If the data is a control message Bit 5 of the frame byte is set.

f) The Version Bits 0, 1 & 2 of the frame byte can be set so that only decoders which have been manufactured with the same version value will process the information. This enables modifications to be made to the Control message system without causing damage to earlier decoders which may be sharing the same information channel. If no value is set all decoders monitoring that paging channel will process the data.

g) The data packet to be encrypted is then assembled. The first bytes are one to eight random 8 bit bytes (configurable). The framing byte is inserted next. The length byte(s) (# is configurable) are calculated to include all data, including the check values at the end of the packet. If the data is an information packet, not a control packet the 7 bit component of the subchannel is inserted. The compressed, stuffed or un-optimised Information data packet is then appended.

h) The check values must be calculated and appended. Several alternatives can be used. The most straight forward requires only that two null characters be inserted. When the packet is decrypted the decryption routine will check for the correct number of nulls. If the data packet is damaged the decryption of the packet will generate different check values and therefore the data packet should be rejected. The invention benefits from the paging networks existing error correction system. The assembled packet structure is shown in FIG. 4.

i) The data is either encrypted or passed for processing to prepare it for transmission across a 7 bit network.

j) The encryption algorithm chosen is independent to the invention. The only requirements are that all the information required is available to the decoding pager. The system could be a Public Key variant or some other. The present invention uses a variant Feed-Back Shift Register encoding scheme. The entire packet is encoded creating an envelope packet that does not expose any data such as length to the public domain. The encoding Keys provided for in the present invention enables the data to be encoded with a private key unique to the receiving unit, a current group key or a future group key. The group key enable many users to share the same network address. Messages which are to be received by the group use either the current or future keys. Messages for a specific unit use the unique key. Thus the present invention is able to specifically issue control messages to a single unit or it can address all units. If a future message key is used to encode a message the receivers will switch the future key to the current key if they receive a message which uses the future key to encode a message. The current and future keys can be changed using encoded control messages. The unique key is load at the time of manufacture and cannot be changed.

k) If the Network on which the data is to be transmitted on is a 7 bit data transmission network the invention must convert "unpack" the data packet from 8 bit bytes to seven bit bytes.

l) The data packet which is in 7 bit format must now be "treated" to enable those 7 bit characters which are prohibited from transmission by the network or reception by a pager decoder to be transformed. A Transformation Escape Character (TEC) is configured be selected from the remaining available character set. (ie 126 =~). This character is used when a prohibited 7 bit character is located in the data string. The TEC character is inserted at that location. A second character is also generated and inserted immediately following. The second character is generated by rule iii & iv. Rules:

i. The TEC character should have a value of 0–31 or 96–127.

ii. The TEC character should not be in the range of 32–95, because the Network prohibited characters are mapped into characters which have a high probability of being legal for transmission.

iii. If the value of the generated encoded and prohibited character is less than 64, then add 64 to the value of the encoded character. Otherwise if the value is 64 or greater subtract 64.

iv. If the value of the generated, encoded character equals that of the Escape Character, either add 64 if the escape character is less than 64 or subtract 64 if greater than 64.

m) If the treated packet is to be sent to a paging address which has been configured as being capable of receiving plain text paging messages the data packet must have a one to three character (preferably three) string prepended to the data string. In the present invention, the three character string "^^^" is used.

n) The data packet is now capable of being transmitted to the paging network and will be accepted by the data-entry system.

At the selective call paging receiver a message decoding procedure enables the message receiver to receive at a single network address, standard unmodified paging messages (tone, numeric and alpha text) as well as being able to selectively accept or reject eight bit Data Information messages, Encoded Control Messages based on the successful decoding of Messages received at the same network address as well as being able to accept or reject Data Information Messages specified for a specific subchannel (0–255) for which the receiver is (not) currently authorised to accept; and to decompress or unpack the Data Information Message depending upon the frame byte bit status; or depending on the receiver configuration, to accept Data Information Messages which are not encoded. At the receiver the decoding process is:

a) If the incoming message has a predetermined header string, which for the example described above is "^^^", and the channel is configured to receive unmodified messages then process as a modified packet, otherwise send the message to a user's application as unmodified paging message (tone, numeric text).

b) If the channel is configured to receive only Data Information Messages process (b–k).

c) Treat the packet to reconstitute the data, removing all Transformations. For each character in the Data Information Message scan for the Escape Character, if found: (repeat for entire packet):

i. Delete the TEC.

ii. If the ASCII value of transformed character is less than 64, then add 64 to the value of the encoded character. Otherwise if the value is 64 or greater subtract 64. Substitute the original character with the modified character.

d) If on a 7 bit network pack the 7 bit characters into 8 bit characters.

e) Decode until successful or fail using the current, unique and future keys. If fail reconstruct.

f) If Message failed to decode, check if channel is configured as an unencoded Information channel. If it is not reject, otherwise;

g) If decode successful or is unencoded data check the frame byte for type of packet and compression.

h) Decompress. If succeeds continue process.

i) Validate the subchannel. If valid release security and pass the data out the end user application.

j) If Control Message parse and process control message.

k) If the successful decode used a future key, update current key with future key.

The invention provides:

1. Transparency 8 bit originating data can be transmitted over restricted 7bit POCSAG messaging networks, where the transmission of specific characters are arbitrarily prohibited. For example, (0–31 & 127 ASCII or 0–13 & 90–95 ASCII).

2. Flexibility

All characteristics of the receiving units configuration, apart from the security identity, can be changed and controlled remotely using uniquely encoded control messages (ECM).

3. Addressability

Individual units can be controlled separately or as part of a group so that a single ECM can change one or all units which belong to the same group on the network.

4. Diversity

Each of the primary RIC channels on any specific receiving unit can each be configured with differing reception and data decoding configurations.

5. Accessibility

All channels, with the exception of "channel not in use" condition can receive and decode (ECM).

6. Permutation

Each channel can be configured to receive a combination of different service types which permits different types of messages to be processed.

7. Five types of message classifications are used:

1. Transparent Data Messages (paging) (T)
2. Data Messages:
3. Unencoded Data (UD)
4. Encoded Data (ED)
5. Encoded Control Messages (ECM)
6. Encoded Service Messages (ESM)

Each Logical Channel can be configured as:

| | | | | | | | | | | |
|---|---|---|---|---|---|---|---|---|---|---|
| 1. | T | + | — | + | — | + | ECM | + | ES | M |
| 2. | T | + | UD | + | — | + | ECM | + | ES | M |
| 3. | — | + | UD | + | + | + | ECM | + | ES | M |
| 4. | T | + | — | + | ED | + | ECM | + | ES | M |
| 5. | — | + | — | + | ED | + | ECM | + | ES | M |
| 6. | Not in Use (NIU) | | | | | | | | | |

8. The invention enables the unit to encode data for transmission. Prior to transmission of the data to the Network Provider, the unencoded data is "piped" from the application central processing unit 142 (see FIG. 2) to a second central processing unit 137 for encryption. If the device has previously received a security clearance for the RIC and target subchannel the data will be encrypted using the current encoding keys.

Figure 1A:
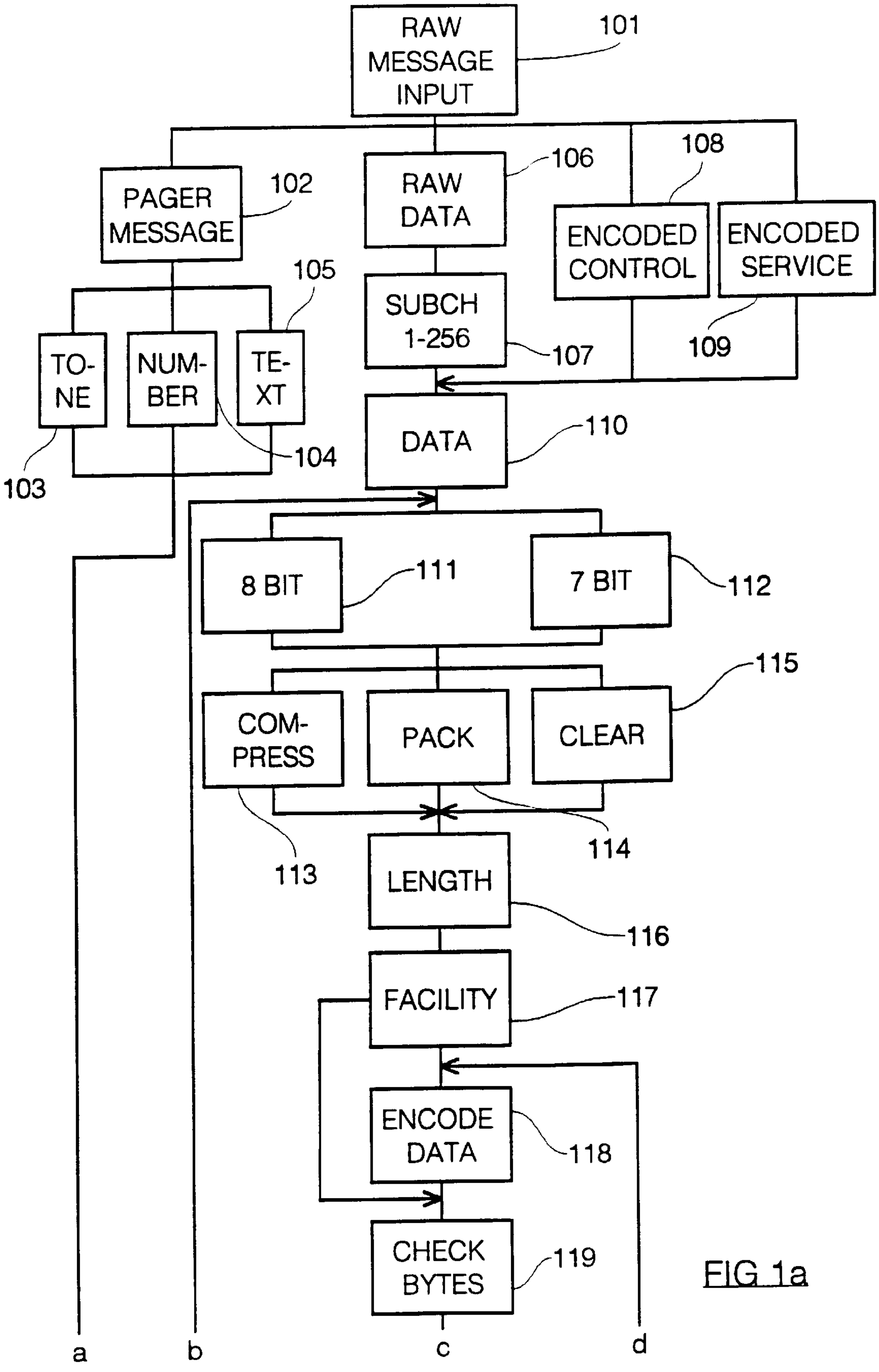
FIGS. 1A and 1B comprise a flow chart showing the pre-transmission process used by the present invention to assemble and transmit communication, command and control packets for a 7 bit paging system.
Figure 1B:
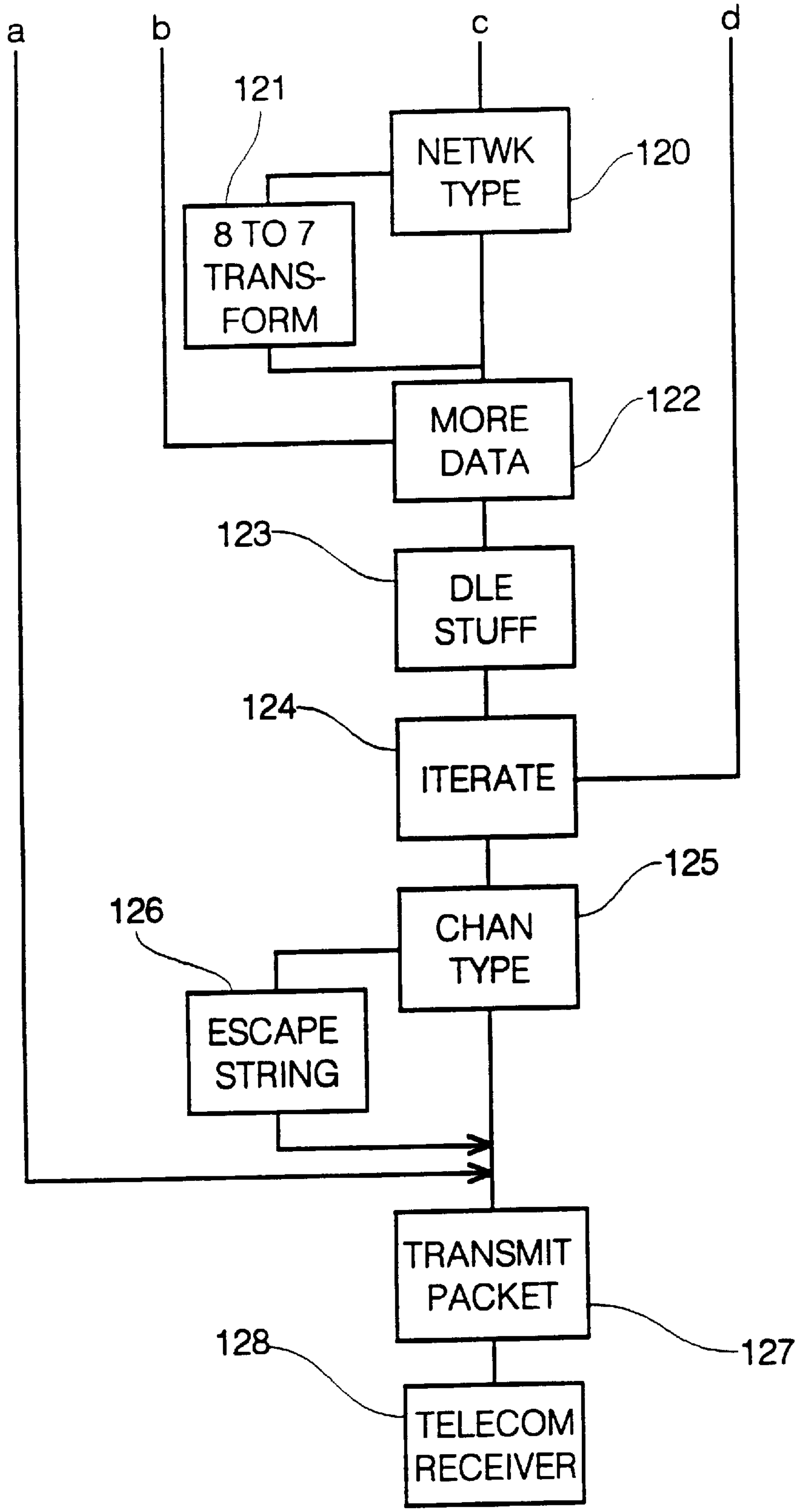

The overall process by which data is originated by an ISP under control of ISP computer 206 is shown in FIGS. 1A and 1B. The left hand blocks 102, 103, 104 and 105 are conventional paging functions and are not part of this invention. Tone number and text data is passed straight to the transmission process step 127 for transmission to the N P's receiver 128 for onward transmission over the network. Blocks 106 to 126 show the process steps which allow non standard data to be transmitted over a standard paging network.

i. Transparent Messages: Where a RIC channel is specified as having a transparent message capability, it permits data packets prepared according to the present invention to be passed directly through to an application handler for processing as standard message by the host networks local protocol. In respect of paging networks this enables all current types of messaging, tone, numeric and text to be passed through.

ii. Data Messages; data packets can either be encoded or non-encoded. Prior to transmission, each packet is processed by an algorithm to analyse the out-going originating data and optimise its packing and compression. If a RIC channel is enabled to receive Data Messages, each message is assigned to one of the 256 subchannels within each logical channel. This identifier is inserted as the leading 7 bit byte of the packet, with the 8th bit inserted in to the facility byte.

iii. Encoded Control Messages: All Control messages will be using either a shared 64 bit Group Key or a key unique to the specific receiver unit. Unlike Data Messages, Control Messages use a different frame byte structure and do not include a subchannel identifying byte. ECMs can be transmitted over the air to one RIC address with directions to modify a different logical RIC.

iv. Encoded Service Messages: Service Messages are encoded using the 64 bit keys and are used to enable the units to receive GMT time stamps and other service messages that are passed through to the application CPU.

Unencoded Data Message:

If the originating Data Message is to be:

Unencoded 8 bit data:

Where the network is restricted to 7 bits the originating data will be "unpacked" into a 7 bit format after which it will be framed to include control and length information as well as being provided with a Check Sum.

Or is:

Unencoded 7 bit data:

The originating data will be framed to include control and length information as well as being provided with a checkbyte(s).

| |
|---|
| <Message> |
| <Subchannel><Message> |
| <length><Subchannel><Message> |
| <facilities><length><Subchannel><Message> |
| <facilities><length><Subchannel><Message><CB> |

Encoded Data Message:

If the Originating Data Message is to be:

Encoded 8 Bit Data

The data is framed with the control data bytes and then encoded using the assigned encoding algorithm and keys.

Or:

Encoded 7 bit printable characters:

If the data does not include eight bit data it is checked to see whether it can be compressed. This is determined by checking a table that includes commonly used printable characters. If True the data is compressed then framed with the Length and Facility control data prior to encoding.

Or:

Encoded 7 bit Data

If the data can not be compressed and it does not contain 8 bit data, the data will be packed from seven bit data into eight bit data bytes, then framed with the Length and Facility control data prior to encoding.

Checkbyte

Dependent on the configuration of the channel the checkbytes are generated by the encoder and are used during the decryption process to verify the integrity of the decoded information.

Encryption:

After the data packet has been generated the data is encrypted using the algorithm and keys for that channel. To hinder crypto-analysis the encryption routine examines the protocol configuration to determine how many random bytes are inserted into the packet prior to encryption. This random component can be changed by the Channel Supervisor.

The encryption engines then generate an 8 bit data packet. The packet is then passed to the transmission control routines.

Transmission control:

Where the transmission network is configured as a 7 bit channel and where the out-going packet contains 8 bit data, the data is expanded from 8 bits to 7 bit format.

Character Escape:

Each byte in Data and Control Message packets are checked against a network specific look-up table that determines whether a character is prohibited. If prohibited, that character is "escaped" using a protocol definable escape character.

This is necessary as the Network Systems provide public data entry "gateways". Users must log on to the data entry application which may also require a password check etc. The data entry application will check the validity of the proposed RIC address as well as check other features of the message including it's length and whether it includes prohibited characters. The "character escape" facility thereby overcomes the Networks arbitrary prohibition of characters.

Transmission Control:

If a channel is configured permitting normal tone/numeric and text paging messages to be received, then whenever an Encoded Control or Data packet (encoded or unencoded) is to be transmitted to that channel a leading "escape string" must be appended to the packet. Each channel is assigned a escape string which the Command protocol enables the channel supervisor to alter. (eg. +++ or vvv or any Network Manager defined string of 1 through 8 128 ASCII characters).

Figure 2:
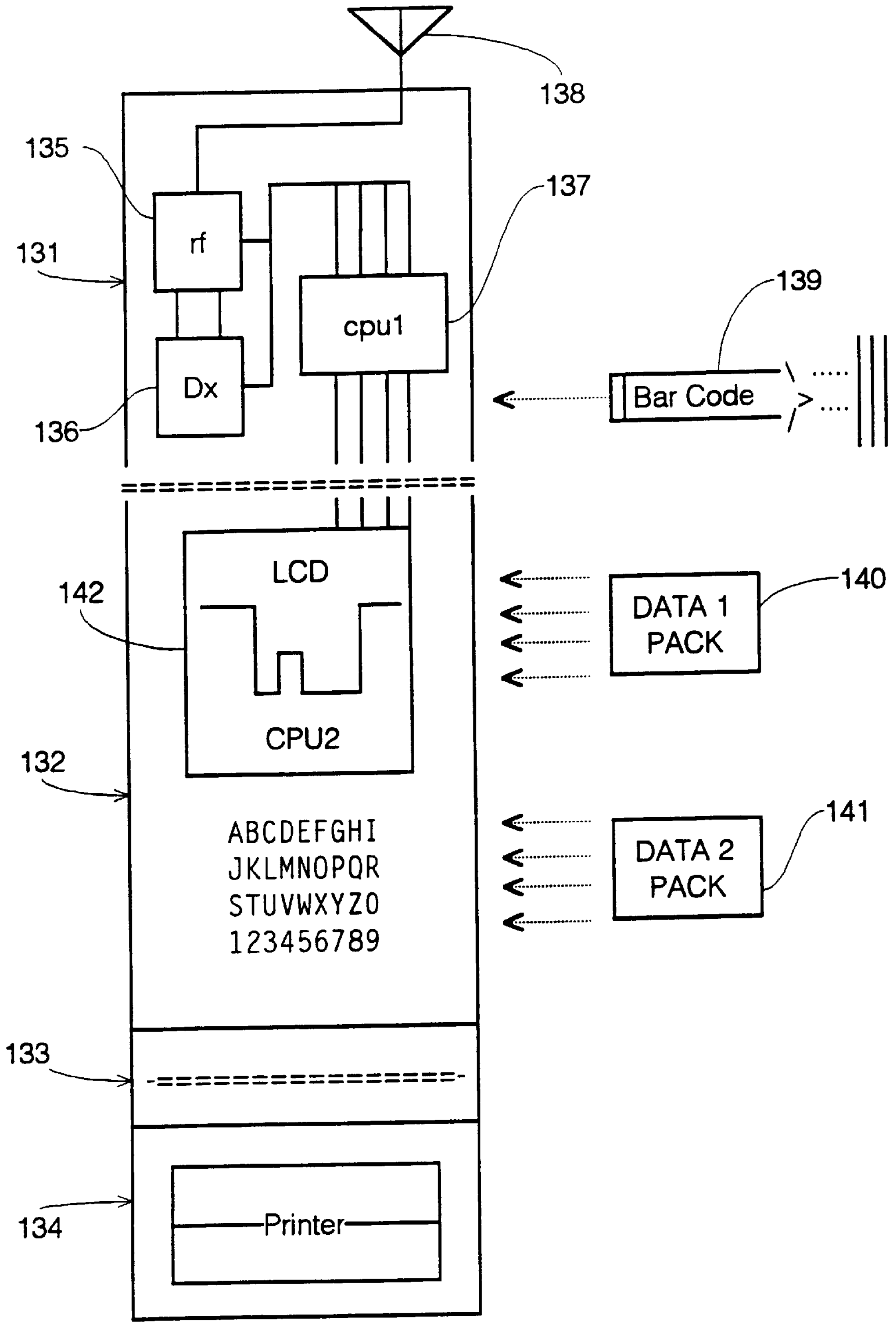
FIG. 2 shows a paging receiver unit incorporating the present invention, FIGS. 3A, 3B, 3C, 3D and 3E comprise a flow chart of the receiver decoder functions.
Figure 3A:
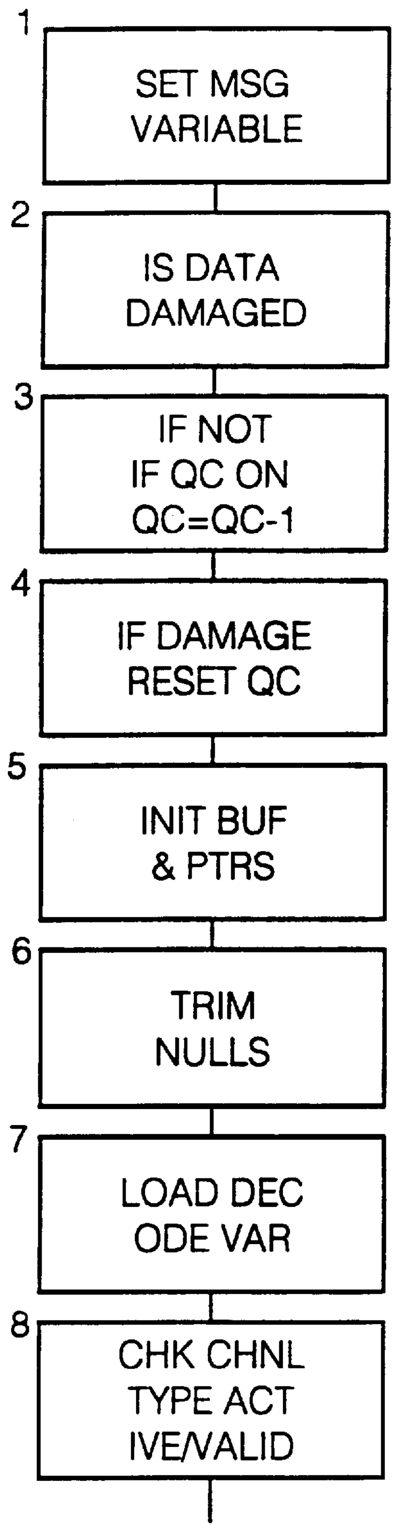
Figure 3B:
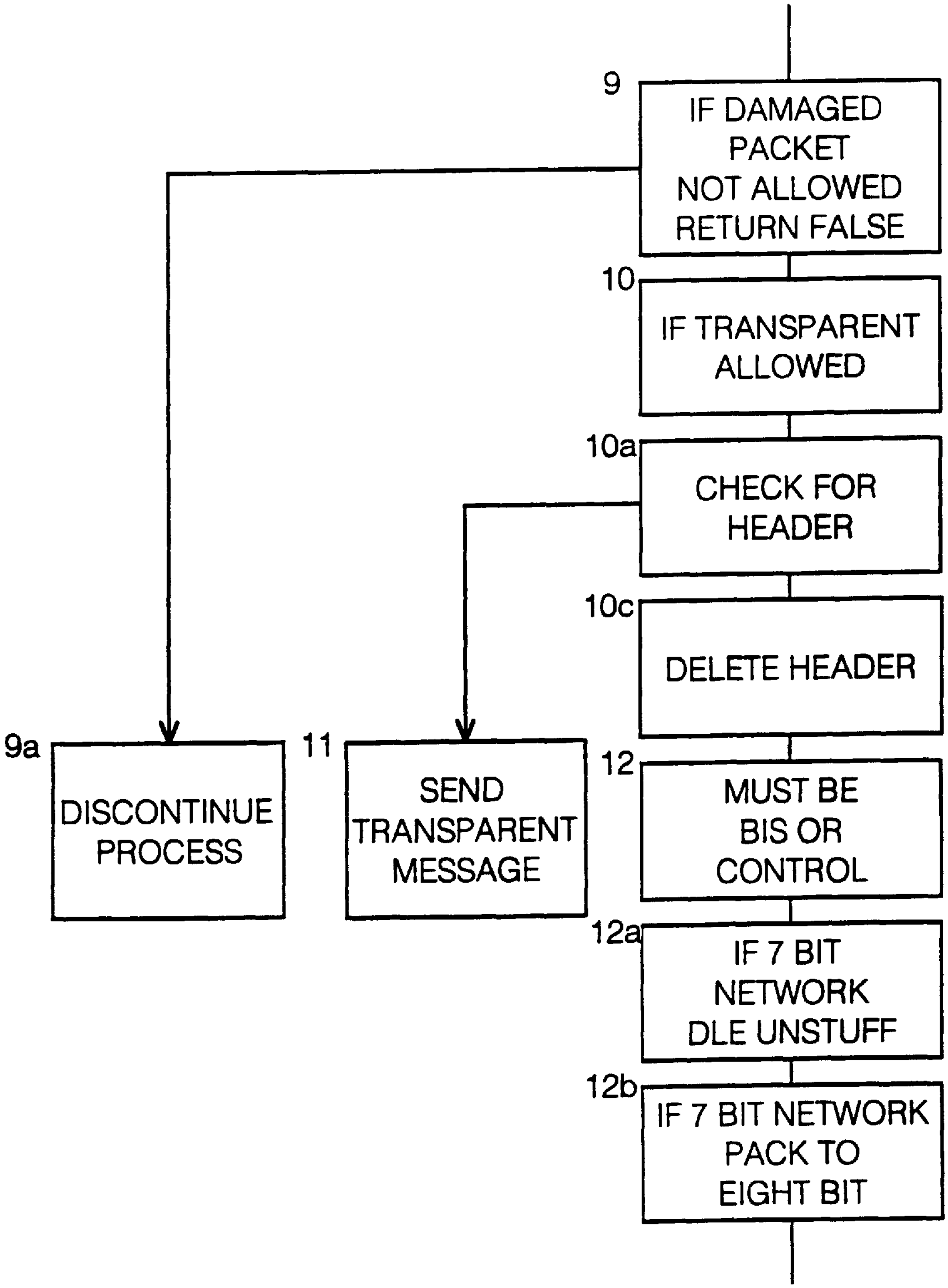
Figure 3C:
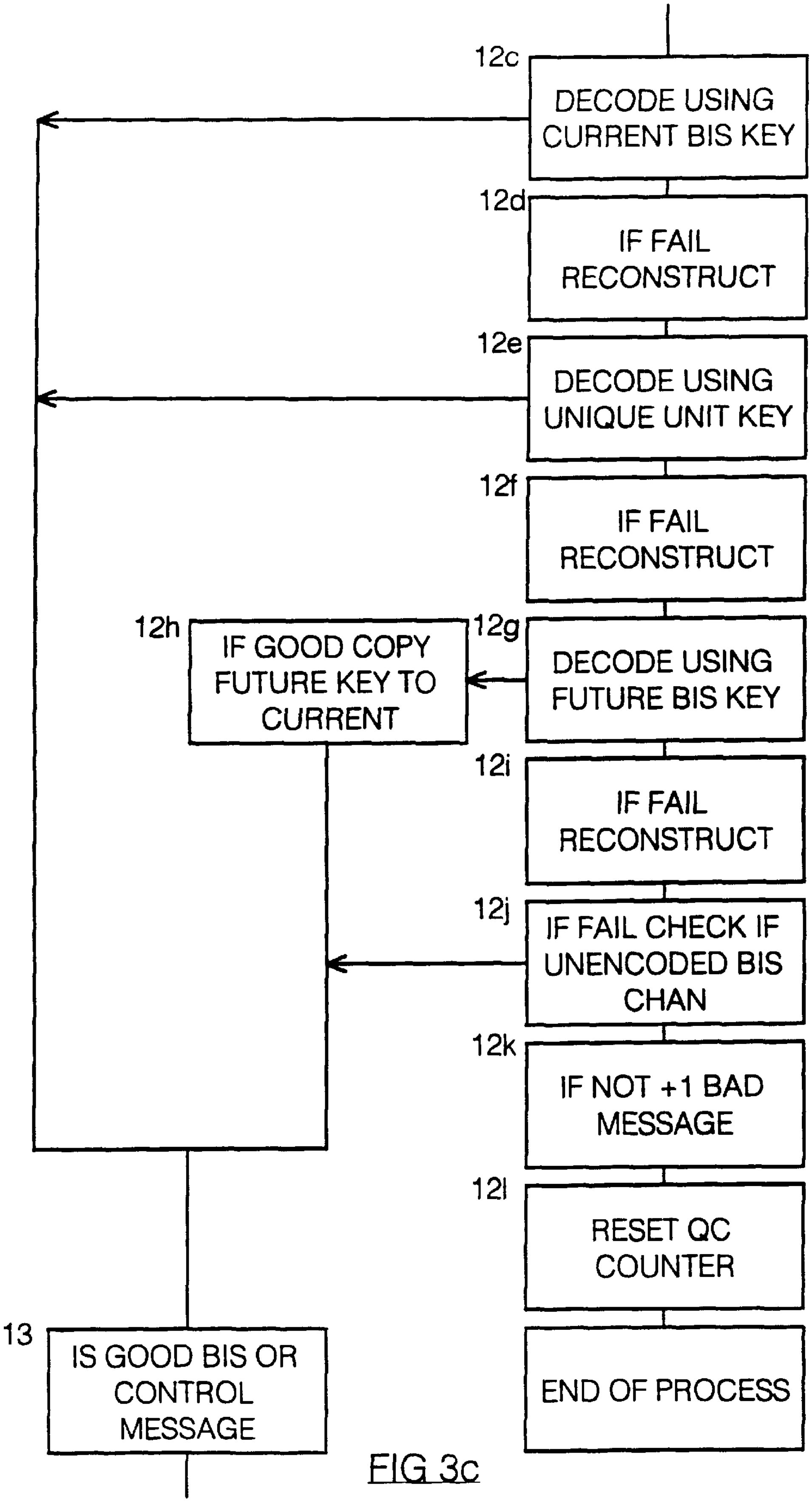
Figure 3D:
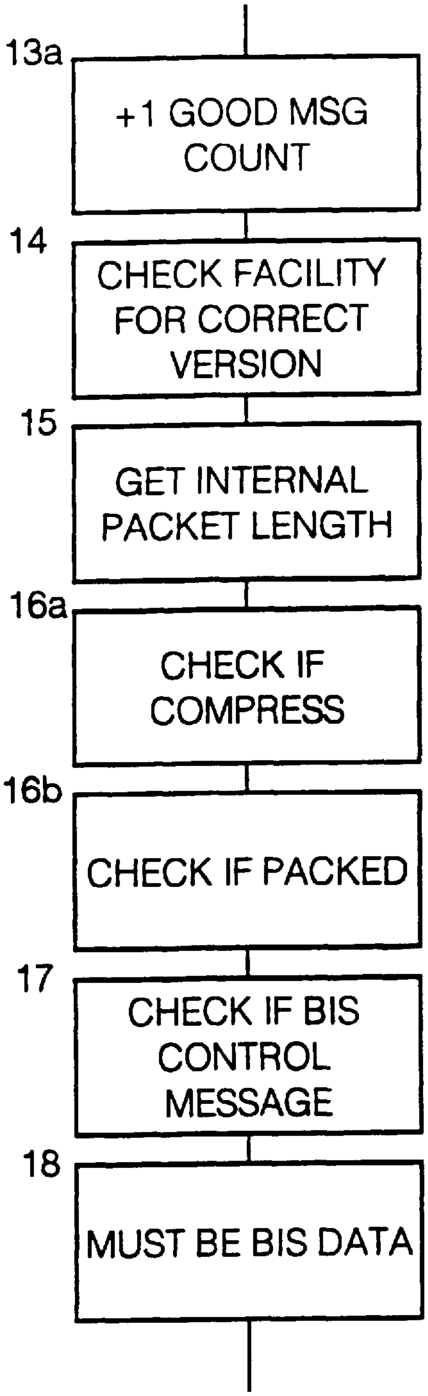
Figure 3E:
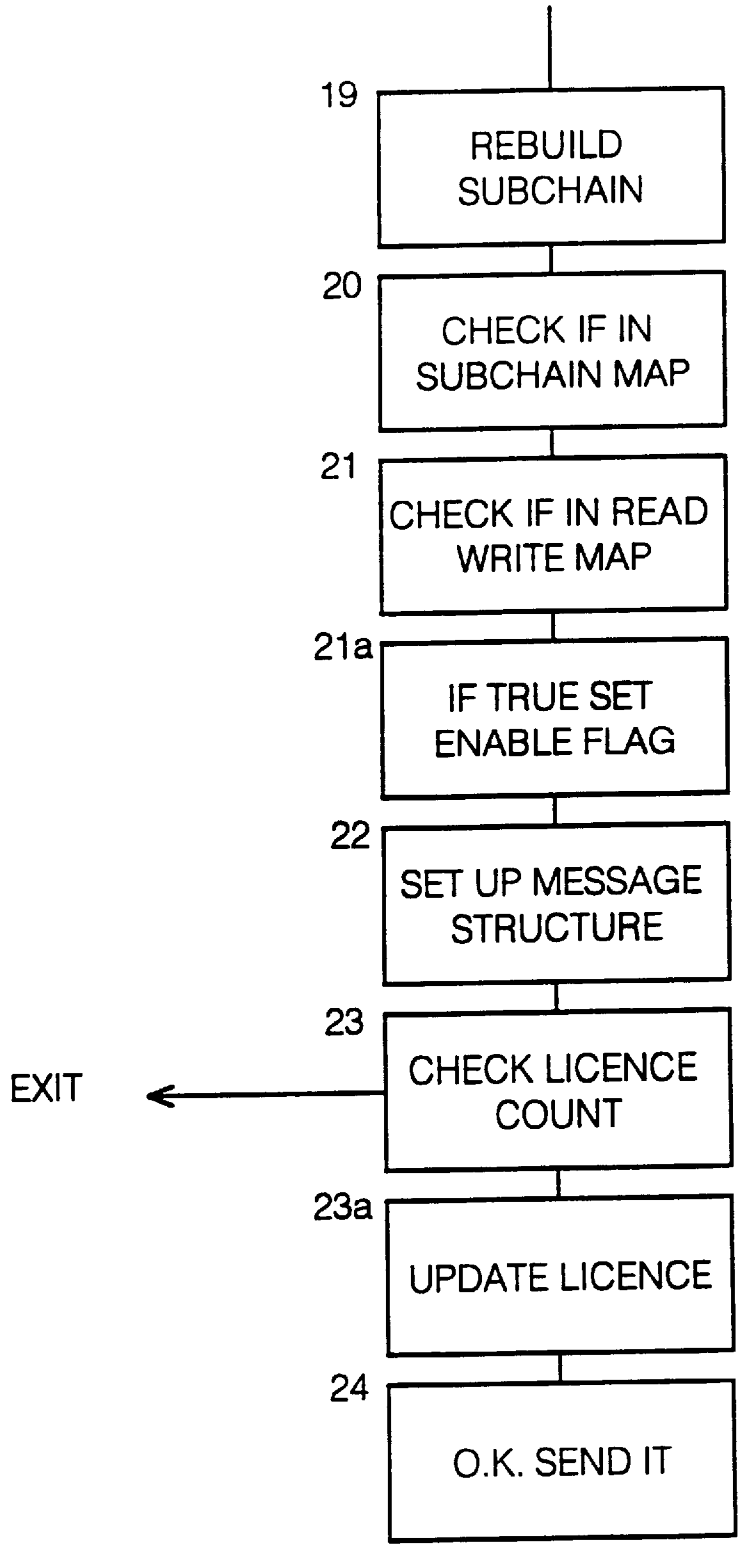

Referring to FIG. 2 the receiver system is specified to operate within a secured microprocessor 137 for instance a Motorola 68HC11E9. This secured mode must prevent any party from examining the contents of the RAM & EEPROM, by destroying the contents of these storage areas when a direct access attempt is made. Microprocessor 137 is linked to a POCSAG decoder 136 (e.g. Philips 5001T) and a tunable radio front-end receiver 135. The processor 137 is also linked via a data-bus to second microprocessor 142 which supports user applications. This may be a PSION Organiser hand held computer, for example.

Processor 137 will accept queries and commands from processor 142. This is necessary when initialising a receiver unit so that it can receive commands over the air and to give it a licence number.

Command delivery to the receiver processor 137 is by:

1. encoded Control packets can be entered by the keyboard 132 or from database records 140, 141 attached to processor 142 as A-P Hex strings. These are CRC validated and converted to binary prior to being communicated to processor 137.
2. Commands can accepted directly over the air after the receiver unit has been initialised from the keyboard to activate the first over-the-air channel.

Commands packet types:

1. First initialisation
   Logical RIC target
   RIC address
   Data Link Escape Channel Type (Paging, Data, Mixed, Encoded) Encryption capability on/off
   Personal message decryption on/off
   CPU/RF Quiet control
   RF receiver function bits
   Seven or eight bit Network.
2. Full initialisation
   Logical RIC target
   RIC address
   Data Link Escape
   Channel Type (Paging, Data, Mixed, Encoded) Encryption capability on/off
   CPU/RF quiet control
   Personal message decryption on/off
   RF receiver function bits
   Seven or eight bit Network
2. Full initialisation
   Logical RIC target
   RIC address
   Channel Type
   Data Link Escape
   Encryption capability on/off
   CPU/RF quiet control
   RF receiver function bits
   Decryption keys
   Licence plausibility key
   Number of random bytes used during encryption
   Number of length bytes
   Number of check sum bytes
   Decryption algorithm
   Special escape string.
3. Subchannels initialisation and user
   read/write capability (0–127 & 128–255), with decryption key
   Logical RIC target
   Decryption keys
   Maximum message count for user Licence
   Subchannels on
   User read/write on
4. Global subchannel switch on. (1–256)
   Target Logical RIC
   Subchannel enable mask
5. Global user read/write capability. (1–256)
   Target Logical RIC
   Read/write enable mask
6. Update decoding key.
   Target Logical RIC
   Future Decryption Key
7. Paging message mapped through subchannel use.
   Target logical RIC
   Target Subchannel truth mask
   Message
8. Licence renewal. (full and partial)
   Target Logical RIC
   Full or partial Licence renewal
   Plausibility value
9. Global disable read/write subchannels (1–256)
   Target Logical RIC
   Read/write subchannel enable mask
10. Global disable subchannels (1–256)./Target Logical RIC
    Subchannel receive enable mask
11. Run code.
    Executable code
12. Patch EEPROM.
    Address
    Length
    Data
13. Application CPU Service Message.
    Data Queries enable the users application CPU 142 to request the current status of cpu 137 and include:

1. Public Identity Number
2. Channel type
3. Receiver Identity Codes i-N
4. Receiver control mask Rf Dx Receiver.
5. Encoder capability on/off
6. Number of Data Messages received (Good/Bad decodes)
7. 1–256, 4 subchannel availability (on/off)
8. 1–256 * 4 subchannel user read/write permission
9. Frame length
10. Check Sum Length
11. DLE character
12. Escape sequence (for shared channel)

The Control system manages as many logical communication channels as the CPU can effectively hold variable arrays for. For instance the POCSAG standard enables approximately 3 million addresses. A practical unit might manage four of those 3 million.

The ECM components can be transmitted via one address with specifications to modify another logical channel.

Unpacking, decoding and processing of the received data:

The data reception and handling routines of the invention, within the existing invocation, enables all processing of the incoming data to be completed internally using the CPU's buffer. Thereby protecting the data at all times from external examination.

The process steps performed by the receiver decoder in filtering for Transparent t Data are shown in the flow chart which comprises FIGS. 3A to 3E. Briefly the steps involved are (using the reference numerals marked on the figure):

1. Commence the process by setting-up the default message process variables.
2. Check whether the data was damaged during reception. This will be signalled by the specialty data decoder when the over the air error correction protocol fails to be able to reconstruct the data.
3. If Quality Control "ON" and data is clean then decrement the QC counter.
4. If damaged data detected reset QC counter to initialisation value.
5. Initialise Buffer and pointers to the incoming data array.

6. Clean up the data by trimming any trailing nulls that remain attached to the end of the incoming raw data packet.
7. Depending on the Logical Channel on which the data was received, initialise the correct decryption variable. (Keys, Escape characters, Packet structure).
8. Check Channel type is active and valid. Return FALSE if not valid.
9. Filter for damaged packet. Discontinue if error prohibited and data is damaged.
10. If Channel is set-up to receive Transparent data capability: Check for Header string. If present delete it from buffer and process data as BIS or CONTROL data.
11. If no Header and the Transparent Facility is set then send raw incoming data to the application CPU. Return TRUE. (ie PAGING Message)
12. Is now either BIS or CONTROL data
12a. If seven bit network DLE unstuff. Check for escape character. If true then check ASCII value of following character. If value less than 64 map character to ASCII value +64 else map to −64.
12b. If seven bit network Pack-to-eight bits.
12c. Decode using CURRENT decode Key. If TRUE will be a GOOD message.
12d. If decode FAIL reconstruct it each time.
12e. If FAIL Decode with unit's UNIQUE UNIT KEY.
12g. If FAIL Decode with unit's FUTURE decode key.
12h. IF SUCCESS, copy FUTURE key to CURRENT key.
12i. If FAIL, check if UNENCODED BIS channel.
12j. If TRUE will be a GOOD message.
12k. If NOT TRUE and all other decodes bad, increment BAD
12l. MESSAGE counter
12m. switch on CPUi QC quieting to improve RF performance. RETURN FALSE. (BADMS G)
13. Must be a GOOD BIS or CONTROL or data packet.
13a. Increment GOOD MESSAGE counter.
14. Check facilities field to confirm it is for this version. If not then RETURN FALSE.
15. Get the internal decoded packet length.
16. Check whether decrypted data is compressed of packed. Either decompress (Huffman) or Unpack to seven bit.
17. Check whether BIS control message. PROCESS CONTROL MSG. If TRUE send Transparent message part through if supplied. RETURN TRUE. (was control message) If Fails RETURN FALSE. (failed control message)
18. Must be BIS data.
19. Rebuild Subchannel number.
20. Check Subchannel BITMAP. If not in BITMAP RETURN FALSE. (receiver not authorised for this subchannel)
21. Check user READ/WRITE BITMAP. If in BITMAP set ENABLED flag.
22. Format the data in Message structure suitable for transfer to the application CPU.
23. Update Licence counter. If FAILED RETURN FALSE. (Need Heartbeat).
24. Return TRUE SEND packet to the receiver application processor.

The advantage of the invention is that enables true 8 bit data to be transmitted over 7 bit restricted access simplex radio paging networks, such as POCSAG and CCIR 584-1, without requiring any change to the network's physical transmission protocol or existing hardware transmission facilities.

A further advantage of the invention is that it supports 8 bit encrypted Command, Communication and Control services enabling the Service Provider to remotely reconfigure receiver units in the field without physical recall or physical handling. The invention supports 8-bit encrypted Broadcast Information Services with targeted addressability of 256 subchannels per Receiver Identification Address, to be delivered via the seven bit restricted radio paging network.

The invention enables data to be compressed or packed prior to data transmission, thereby reducing the volume of data actually being transmitted over the restricted seven bit paging network.

This invention has the further advantage that it enables 7 bit POCSAG and similar networks to remotely manage groups of pager units, sharing the same RIC address, to enforce credit control by providing the capability to disable/enable and reconfigure individual units remotely by transmitting encoded control commands. This will permit the Networks to offer commercial services which are currently unavailable on POCSAG public paging 7 bit networks.

The invention enables these benefits, functions and features to be implemented, on unmodified POCSAG, CCIR 584-1 and other similar radio paging data networks.

An example of the application of the encoding and decoding algorithms of the present invention to a message is shown as FIG. 6*a*–6*e*.

I claim:

1. A method of preparing a message packet for digital data transmission which enables eight bit data, binary data and control messages to be encapsulated in a 7 bit character packet where one or more of the 7 bit characters are prohibited comprising the steps of:

(1) analysing a message to be transmitted to ascertain if it is a control message or a data message, (2) if a data message, (a) analysing it to determine if it can be compressed according to a known compression technique and if so compressing the data by that technique, (b) if compression was not possible, and if the data consists of characters which are uniquely determined by 7 bits, treating the data as a 7 bit character string and stuffing the 7 bit character string into an 8 bit string, (c) assigning a sub-channel number to data which is processed according to steps 2(a) or (b) or which has not been so processed, (3) assembling the message packet which incorporates (a) framing information which includes bits which indicate whether the packet is control data or message data, (b) information indicative of assigned sub-channel where the message is a data message, and (c) the control data or (d) the compressed, stuffed or unoptimised message data, (4) unpacking the packet from 8 bit bytes to form a 7 bit byte packet, (5) analysing the 7 bit byte packet to ascertain if it contains any prohibited characters and if so substituting such prohibited characters with a suitable escape character and a complementary check character to produce the message packet for transmission.

2. A method according to claim 1 further comprising the step of encrypting packets assembled by step (3).

3. A method of receiving an incoming encoded binary message having packets transmitted over a paging network by a selective call receiver which enables the message receiver to receive at a single network address, unmodified paging messages and to selectively accept or reject eight bit data information messages and encoded control messages as well as being able to accept or reject data information messages specified for a specific subchannel (0–255) for which the receiver respectively is or is not currently authorised to accept; for each received packet of an incoming message the method comprising the steps of:

(1) if the received packet has a predetermined header and the receiver is configured to receive unmodified messages, then processing the packet as a modified packet according to steps (2) to (8), otherwise sending the packet to a user's application as an unmodified paging message, (2) if the receiver is configured to receive only data information messages processing the packet according to steps (3) to (8), (3) treating the packet as 7 bit characters and reconstituting any characters indicated by a predetermined flag, (4) packing the 7 bit characters into 8 bit characters, (5) checking a frame byte for type of packet and compression, (6) decompressing the packet to data, (7) validating the subchannel and if valid releasing security passing the data to an end user application, and (8) if the message is a control message parsing and processing the control message.

4. A method according to claim 3 wherein if the received message was encrypted then additionally carrying out the step of decrypting the 8 bit characters produced by steps (3) and (4) before proceeding to step (5).

5. An apparatus for conditioning data for transmission which enables eight bit data, binary data and control messages to be encapsulated in a seven bit character packet where one or more of the seven bit characters are prohibited, comprising:

(1) means for analysing a message to be transmitted to ascertain if it is a control message or a data message, (2) if a data message, (a) means for analysing the data message to determine if it can be compressed according to a known compression technique and if so for compressing the data by that technique, (b) if compression was not possible, and if the data consists of characters which are uniquely determined by 7 bits, means for treating the data as a 7 bit character string and for stuffing the 7 bit character string into an 8 bit string, (c) means for assigning a sub-channel number to data which is processed according to the means for analysing and compressing and the means for treating and stuffing or which has not been so processed, (3) means for assembling a message packet which incorporates (a) framing information which includes bits which indicate whether the packet is control data or message data, (b) information indicative of assigned sub-channel where the message is a data message, and (c) the control data or (d) the compressed, stuffed or unoptimised message data, (4) means for unpacking the packet from 8 bit bytes to 7 bit bytes, (5) means for analysing the 7 bit byte packet to ascertain if it contains any prohibited characters and if so for substituting such prohibited characters with a suitable escape character and a complementary check character to produce the message packet for transmission.

6. An apparatus for receiving an incoming encoded binary message having packets transmitted over a paging network by a selective call receiver which enables the message receiver to receive at a single network address, unmodified paging messages and to selectively accept or reject eight bit data information messages and encoded control messages as well as being able to accept or reject data information messages specified for a specific subchannel (0–255) for which the receiver respectively is or is not currently authorized to accept, for each received packet of an incoming message, the apparatus comprising:

(1) means for determining if the received packet has a predetermined header and the receiver on which the message is received is configured to receive unmodified messages, and if so, then for processing the packet as a modified packet according to means (2) to (8), otherwise sending the packet to a user's application as an unmodified paging message, (2) means for determining if the receiver is configured to receive only data information messages and if so for processing the packet according to means (3) to (8), (3) means for treating the packet as 7 bit characters and for reconstituting any characters indicated by a predetermined flag, (4) means for packing the 7 bit characters into 8 bit characters, (5) means for checking a frame byte for type of packet and compression, (6) means for decompressing the packet to data, (7) means for validating the subchannel and if valid for releasing security and for passing the data to an end user application, and (8) means for determining if the message is a control message and, if so, for parsing and processing the control message.

* * * * *

UNITED STATES PATENT AND TRADEMARK OFFICE

CERTIFICATE OF CORRECTION

PATENT NO. : 5,771,238

DATED : June 23, 1998

INVENTOR(S) : Michael Seward Sutton

It is certified that error appears in the above-indentified patent and that said Letters Patent is hereby corrected as shown below:

On title page, item

[22] PCT Filed: March 10, 1994

Signed and Sealed this

Sixth Day of October, 1998

Attest:

BRUCE LEHMAN

*Attesting Officer*

*Commissioner of Patents and Trademarks*